United States Patent
Huang

(10) Patent No.: US 7,579,788 B2
(45) Date of Patent: Aug. 25, 2009

(54) POWER SUPPLY SYSTEM OF A LIGHT SOURCE AND A LIGHT SOURCE ACTUATING METHOD

(75) Inventor: Chung-Jung Huang, Pingjhen (TW)

(73) Assignee: Qisda Corporation, Taoyuan County (TW)

( * ) Notice: Subject to any disclaimer, the term of this patent is extended or adjusted under 35 U.S.C. 154(b) by 207 days.

(21) Appl. No.: 11/878,853

(22) Filed: Jul. 27, 2007

(65) Prior Publication Data

US 2008/0024656 A1 Jan. 31, 2008

(30) Foreign Application Priority Data

Jul. 27, 2006 (TW) ............................... 95127562 A

(51) Int. Cl.
*G05F 1/00* (2006.01)
(52) U.S. Cl. .................. 315/291; 315/246; 315/177
(58) Field of Classification Search ................. 315/177, 315/246, 276, 279, 287, 291, 294, 295, 297, 315/299–302, 307, 360, 361
See application file for complete search history.

(56) References Cited

U.S. PATENT DOCUMENTS

2006/0071609 A1* 4/2006 Chou et al. ................. 315/112

* cited by examiner

*Primary Examiner*—Douglas W Owens
*Assistant Examiner*—Jianzi Chen

(57) ABSTRACT

A power supply system of a light source includes a luminance control unit, luminance adjusting unit, control circuit and voltage transformer. The luminance control unit is for receiving a turn-on signal and outputting a first luminance signal during a predetermined time period. The luminance adjusting unit is for outputting a second luminance signal according to an input of a user. The control circuit is for outputting a power control signal according to the first luminance signal and the second luminance signal. The voltage transformer is for outputting an AC voltage for driving a light source according to the power control signal. During the predetermined time period, the control circuit outputs the power control signal according to the first luminance signal and after the predetermined time period, the control circuit outputs the power control signal according to the second luminance signal.

20 Claims, 4 Drawing Sheets

POWER SUPPLY SYSTEM OF A LIGHT SOURCE AND A LIGHT SOURCE ACTUATING METHOD

This application claims the benefit of Taiwan application Serial No. 95127562, filed Jul. 27, 2006, the subject matter of which is incorporated herein by reference.

BACKGROUND OF THE INVENTION

1. Field of the Invention

The invention relates in general to a power supply system of a light source and light source actuating method, and more particularly to a power supply system of a light source and light source driving method, which can prevent light sources from overloading.

2. Description of the Related Art

Along with the coming digital era and wide spread of the computer network, the display has an inevitable tendency to be flat and thin in design. The power supply system of a light source is an essential component for driving the light source in the flat display. It determines the reliability and stability of the light source and directly affects the image quality of the flat display.

Referring to FIG. 1, a block diagram of a power supply system of a conventional light source is shown. The power supply system 100 of a light source includes a voltage transformer 110, a feedback circuit 120 and a control circuit 130. The voltage transformer 110 receives a direct current (DC) input voltage DC and transforms the DC input voltage DC into an alternating current (AC) voltage AC for the light source 10 according to a power control signal C1. The feedback circuit 120 is used for receiving the feedback current I1 outputted by the light source 10 and generating a feedback voltage L1 for the control circuit 130 according to the feedback current I1. The control circuit 130 receives a turn-on signal $S_{ON}$, luminance adjusting signal $V_{Adjust}$ and feedback voltage L1 and accordingly generates a power control signal C1.

The AC voltage AC received by the light source 10 includes an actuation voltage and an operational voltage. The actuation voltage has a higher voltage level than the operational voltage, and the levels of the actuation voltage and operational voltage are both affected by the frequency and duty cycle of the power control signal C1 outputted by the control circuit 130. The actuation voltage should have an enough high level to reach a breakdown voltage of the light source 10 such that the light source 10 can be lighted up. After the light source 10 is lighted up, the AC voltage AC is adjusted to be the operational voltage.

As shown in FIG. 3A, before the time point t1, the light signal $S_{ON}$ is not inputted to the power supply system 100 and thus the light source 10 is not actuated. At the time, the luminance adjusting signal Sba can maintain at any voltage level set by the user. At the time t1, the turn-on signal $S_{ON}$ is inputted to the power supply system 100 for actuating the light source 10 and the luminance adjusting signal Sba still maintains the voltage level set by the user.

However, in the process of transforming the voltage AC to be the operational voltage, if unsuitably controlled, between the time points t1 and t2 when the turn-on signal $S_{ON}$ and the luminance adjusting signal Sba function at the same time, the duty cycle of the power supply system 100 of the light source will exceed limitation, and consequently, the power supply system 100 stops operating.

Therefore, how to prevent the power supply system exceeds the limitation of the duty cycle in the process of lighting the light source is an essential issue to be resolved.

SUMMARY OF THE INVENTION

The invention is directed to a power supply system of a light source and light source actuation method. In the light source actuation process, the duty cycle of the power supply system can be protected from exceeding the limitation in order to successfully light up the light source.

According to a first aspect of the present invention, a power supply system is provided. The power supply system comprises a luminance control unit, a luminance adjusting unit, a control circuit and a voltage transformer. The luminance control unit is for receiving a turn-on signal and outputting a first luminance signal during a predetermined time period. The luminance adjusting unit is for outputting a second luminance signal according to an input of a user. The control circuit is for outputting a power control signal according to one of the first luminance signal and the second luminance signal. The voltage transformer is for outputting an alternating current (AC) voltage for driving a light source according to the power control signal. During the predetermined time period, the control circuit outputs the power control signal according to the first luminance signal and after the predetermined time period, the control circuit outputs the power control signal according to the second luminance signal. The first luminance signal is substantially smaller than the second luminance signal.

According to a second aspect of the present invention, a light source actuation method is provided. The method is applied to a power supply system of a light source. The method comprises steps of receiving a turn-on signal and accordingly generating a first luminance signal through a luminance control unit; receiving an adjusting signal and accordingly providing a second luminance signal by using a luminance adjusting unit; selectively receiving the first luminance signal and the second luminance signal by using a control circuit and accordingly generating a power control signal for driving a light source. During a predetermined time period, the control circuit receives the first luminance signal and accordingly generates the power control signal, and after the predetermined time period, the control circuit receives the second luminance signal and accordingly generates the power control signal. The first luminance signal is substantially smaller than the second luminance signal.

According to a third aspect of the present invention, a power supply system of a light source is provided. The power supply system comprises a light source actuation unit, a luminance adjusting unit, a control circuit, a voltage transformer and a luminance control unit. The light source actuation unit is for outputting a turn-on signal to actuate a light source. The luminance adjusting unit is for outputting a luminance adjusting signal, wherein the luminance adjusting signal is selected to be one of a higher luminance signal or a lower luminance signal. The control circuit is electrically coupled to the light source actuation unit and the luminance adjusting unit for outputting a light source luminance signal according to the turn-on signal and the luminance adjusting signal. The voltage transformer is electrically coupled to the control circuit and outputting an electric power for driving the light source according to the light source luminance signal. The luminance control unit is electrically coupled to the luminance adjusting unit and the light source actuation unit for selectively changing the luminance adjusting signal. When the luminance control unit detects the turn-on signal, and the luminance adjusting signal is the higher luminance signal, the luminance control unit maintains the luminance adjusting signal as the lower luminance signal for a predetermined time period. After the predetermined time period, the luminance control unit restores the luminance adjusting signal to be the higher luminance signal.

According to a fourth aspect of the present invention, a light source actuation method is provided. The method is applied to a power supply system of a light source. The method comprises steps of outputting a turn-on signal by using a light source actuation unit; outputting a luminance adjusting signal by using a luminance adjusting unit, wherein the luminance adjusting signal is selected to be a higher luminance signal or a lower luminance signal; selectively changing the luminance adjusting signal by using a luminance control unit; outputting a light source luminance signal according to the turn-on signal and the luminance adjusting signal by using a control circuit; and outputting an electric power to drive the light source according to the light source luminance signal by using a voltage transformer. When the luminance control unit detects the turn-on signal and the luminance adjusting signal is the higher luminance signal, the luminance control unit changes the luminance adjusting signal to be the lower luminance signal to maintain a predetermined time period. After the predetermined time period, the luminance control unit restores the luminance adjusting signal to be the higher luminance signal.

The invention will become apparent from the following detailed description of the preferred but non-limiting embodiments. The following description is made with reference to the accompanying drawings.

DETAILED DESCRIPTION OF THE INVENTION

Figure 1:
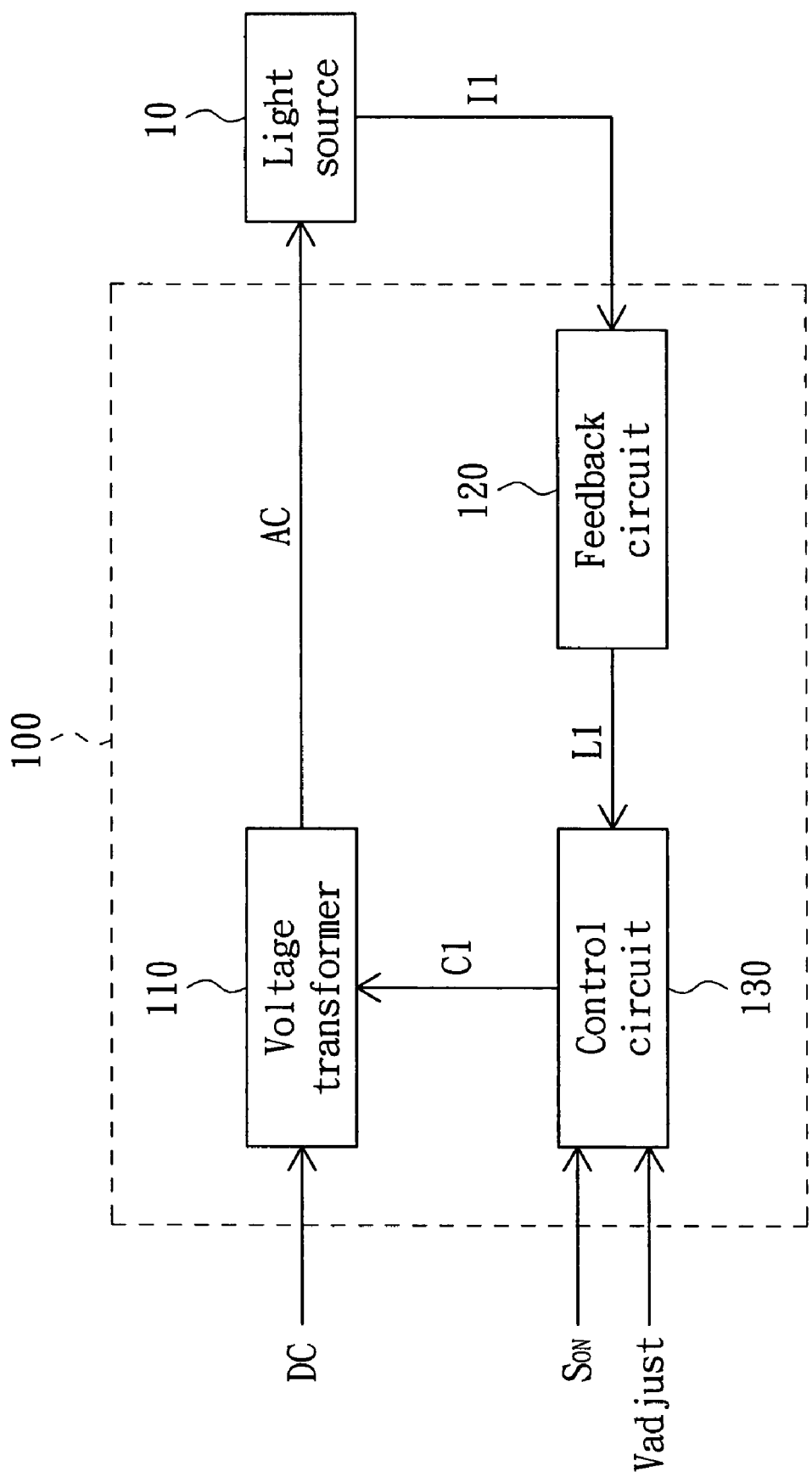
FIG. 1 is a block diagram of a power supply system of a conventional light source.
Figure 2:
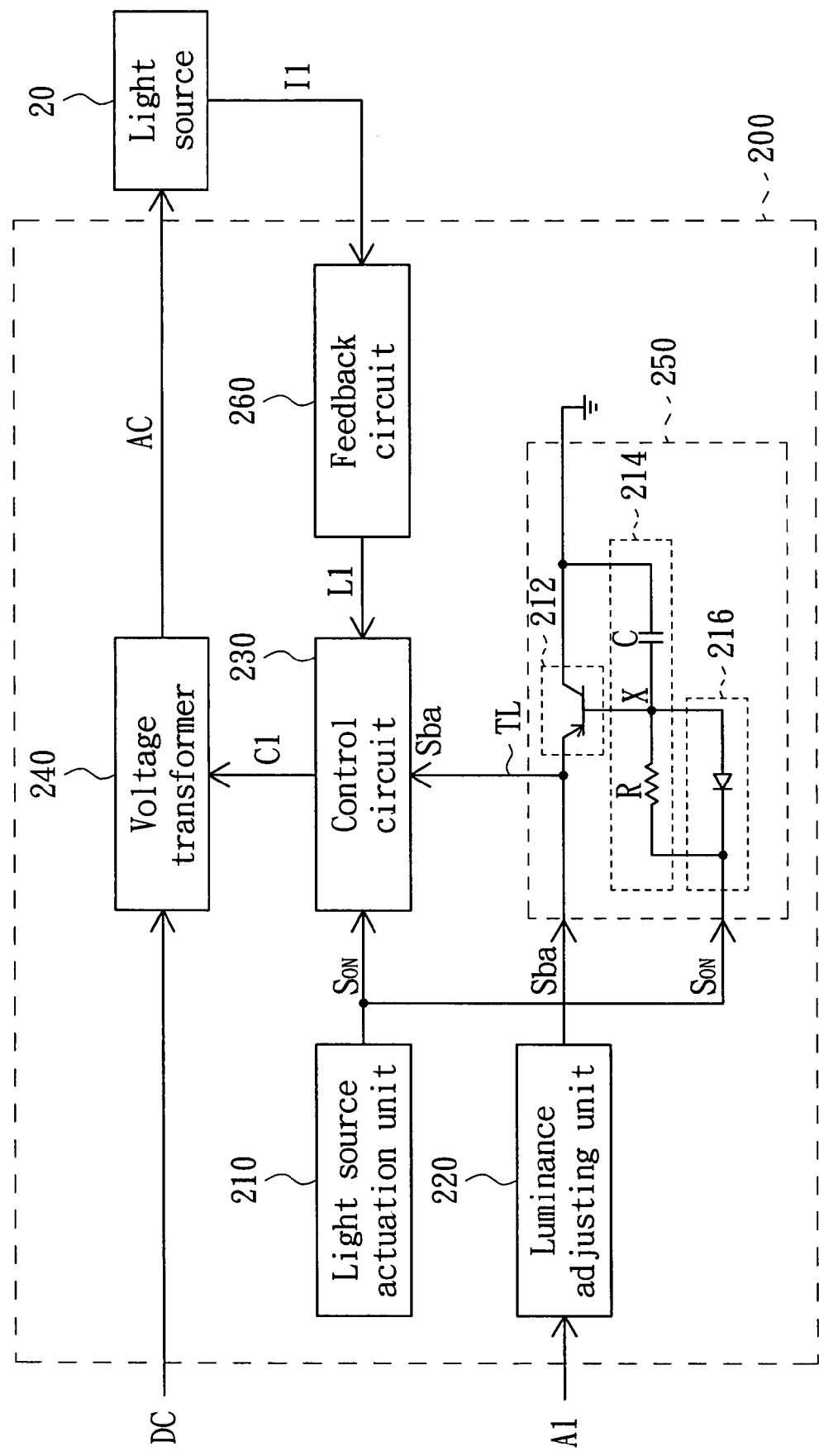
FIG. 2 is a block circuit diagram of a power supply system of a light source according to a preferred embodiment of the invention.

Referring to FIG. 2, a block circuit diagram of a power supply system of a light source according to a preferred embodiment of the invention is shown. The power supply system 200 of a light source includes a luminance adjusting unit 220, control circuit 230, voltage transformer 240 and luminance control unit 250. The luminance adjusting unit 220 is for outputting a luminance adjusting signal Sba, which is transmitted to the control circuit 230 via the luminance control unit 250. The luminance control unit 250 further receives a turn-on signal $S_{ON}$.

Figure 3A:
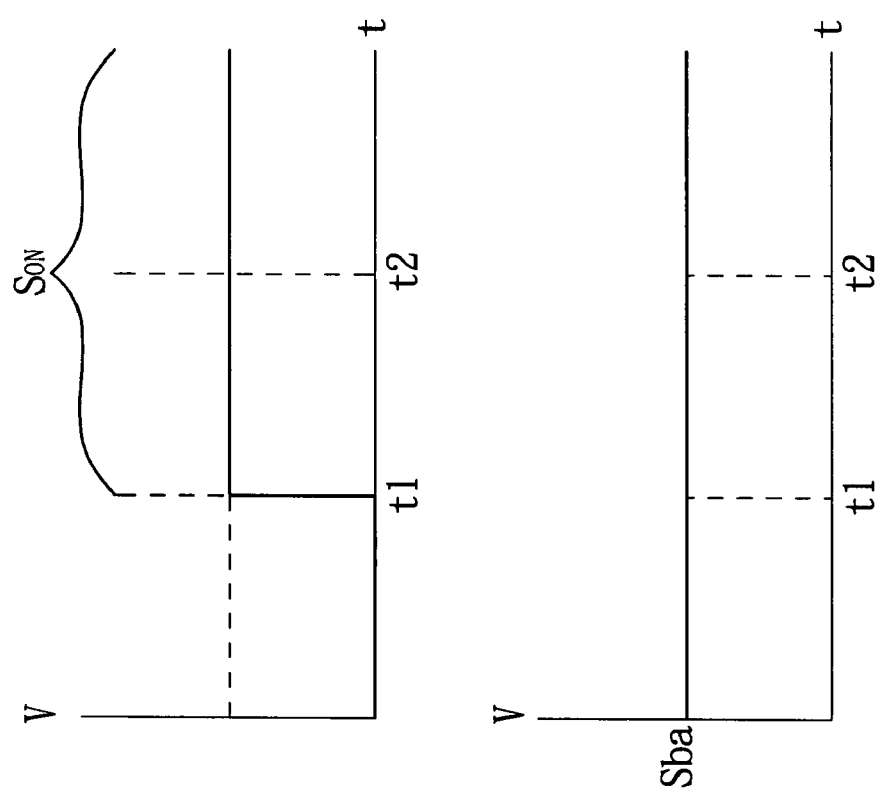
FIG. 3A is a waveform diagram of the conventional turn-on signal $S_{ON}$ and luminance adjusting signal Sba.
Figure 3B:
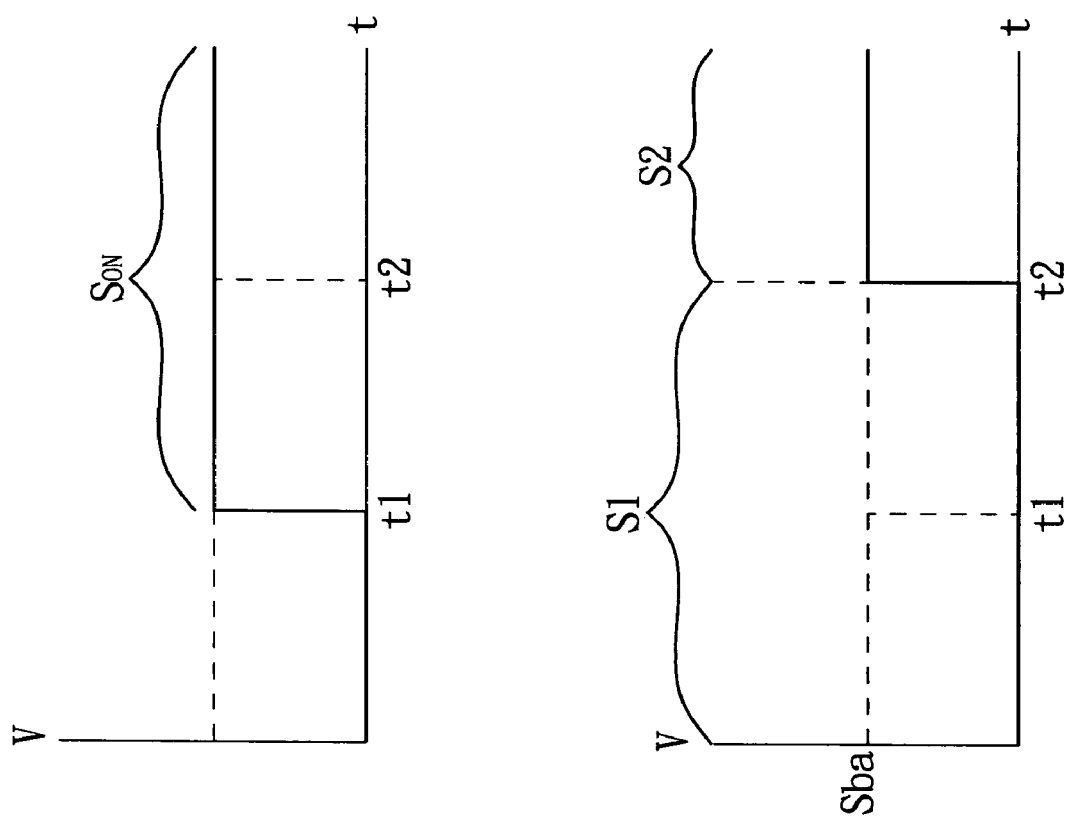
FIG. 3B is a waveform diagram of the conventional turn-on signal $S_{ON}$ and luminance adjusting signal Sba according to a preferred embodiment of the invention.

Referring to FIG. 3B at the same time, a waveform diagram of the turn-on signal $S_{ON}$ and luminance adjusting signal Sba according to the preferred embodiment of the invention is shown. The luminance adjusting signal Sba includes a lower luminance signal and a higher luminance signal, which are respectively the first luminance signal S1 and the second luminance signal S2. When the luminance control unit 230 detects the turn-on signal $S_{ON}$, the luminance control unit 250 changes the luminance adjusting signal Sba to the first luminance signal S1 to maintain a predetermined time period. After the predetermined time period, the luminance control unit 250 restores the luminance adjusting signal to be the second luminance signal S2.

That is to say, during the predetermined time period, the luminance control unit 250 outputs the first luminance signal S1 to be the luminance adjusting signal Sba. After the predetermined time period, the luminance adjusting unit 220 can output the second luminance signal S2 according to the luminance adjusting signal A1 set by the user to be the luminance adjusting signal Sba. The control circuit 230 outputs a power control signal C1 according to the first luminance signal S1 and the second luminance signal S2. The voltage transformer 240 outputs an AC voltage AC for driving a light source 20, such as a light source, according to the power control signal C1.

During the predetermined time period, the control circuit 230 outputs the power control signal C1 according to the first luminance signal S1 and after the predetermined time period, the control circuit 230 outputs the power control signal C1 according to the second luminance signal S2. The first luminance signal S1 is substantially smaller than the second luminance signal S2.

Preferably, the control circuit 230 is an OZ960/OZ964 series pulse width modulator (PWM) controller. Take the OZ964 PWM controller as an example, the luminance adjusting unit 220 is electrically coupled to the ninth pin of the OZ964 PWM controller via the luminance control unit 250 for transmitting the first luminance signal S1 and second luminance signal S2 to the ninth pin. The OZ964 PWM controller detects a current flux of the light source 20 by sensing a voltage of the ninth pin. Therefore, the luminance of the light source 20 can be set through the voltage of the ninth pin.

As shown in FIG. 2, power supply system 200 further includes a light source actuation unit 210 and feedback circuit 260. The light source actuation unit 210 is for outputting the turn-on signal $S_{ON}$ to actuate the light source 20. The feedback circuit 260 is for receiving a feedback current I1 outputted by the feedback voltage L1. The control circuit 230 is further used for receiving the turn-on signal $S_{ON}$.

Besides, the luminance control circuit 250 includes a switch 212 and charging circuit 214. The charging circuit 214 is coupled to the light source actuation unit 210 and is charged by the turn-on signal $S_{ON}$. The switch is coupled to the charging circuit 214 and luminance adjusting unit 220 for controlling the luminance adjusting signal Sba. When the luminance control unit 250 receives or detects the turn-on signal $S_{ON}$, the charging circuit 214 receives the turn-on signal $S_{ON}$ with a high voltage level to charge. During the period when the turn-on signal $S_{ON}$ with the high level is received until the charging circuit 214 finishes charging, the switch 212 is conducted to change the luminance adjusting signal Sba to be the first luminance signal S1. After the charging circuit 214 finishes charging, the switch 212 is turned off to change the luminance adjusting signal Sba to be the second luminance signal S2 for the control circuit 230.

Preferably, the charging circuit 214 includes a resistor R and a capacitor C, which are electrically coupled to a node X. The switch 212 is a PNP-type bipolar junction transistor (BJT) having a base, an emitter and a collector. The base is coupled to the node X between the resistor R and capacitor C. The emitter is coupled to the specific pin (such as the above ninth pin) of the control circuit 230 for setting luminance of the light source 20. The collector is coupled to a ground voltage. During the time when the switch 212 is conducted, the ground voltage is outputted via the turned-on switch 212 to lower down the voltage level of the luminance adjusting signal Sba and accordingly the luminance control unit 250 can output the ground voltage to be the first luminance signal S1. After the switch 212 is turned off, the ground voltage cannot be outputted via the switch 212, and thus the luminance adjusting signal Sba is outputted to the control circuit 230 via the luminance control unit 250 as the second luminance signal S2.

Besides, the luminance control unit 250 further includes a discharging circuit 216, such as a diode. The diode has one end coupled to the light source actuation unit 210 for receiving the turn-on signal $S_{ON}$ and the other end coupled to the node X in the charging circuit 224. After the power supply system 200 of the light source is turned off, charges of the charging circuit 224 are discharged via the diode.

As shown in FIG. 3B, before the time point t1, the turn-on signal $S_{ON}$ is not inputted to the power supply system 200, and thus the light source 20 is not actuated by the power supply system 200. A low voltage is outputted by the power supply system 200 and thus the PNP-type BJT of the switch 212 maintains at a turn-on state. Therefore, no matter what the user originally set, the luminance adjusting signal Sba maintains to be the first luminance signal S1. At the time point t1, the turn-on signal $S_{ON}$ is inputted to the power supply system 200 to actuate the light source 20.

Between the time points t1 and t2, the switch 212 is still conducted, and thus the luminance adjusting signal Sba maintains at the first luminance signal S1. The charging circuit 214 receives the turn-on signal $S_{ON}$ with a high voltage level for charging. Owing that the first luminance signal S1 is the ground voltage, it can be ensured that the operation frequency of the control circuit 230 will not be over large after receiving the turn-on signal $S_{ON}$ and the first luminance signal S1 and thus the power supply system 200 will not exceed an operational limitation. Therefore, the control circuit 130 can control the voltage transformer 240 to output the AC voltage AC for lighting up the light source 20 successfully.

After the light source 20 is actuated for a period of time and the light source 20 becomes stable, such as a the time point t2, the charging circuit 214 finishes charging and the switch 212 is turned off. The second luminance signal S2 of the luminance adjusting signal Sba is received via the luminance control unit 250 and outputted in a bypass way to the control circuit 230. The control circuit 230 receives the second luminance signal S2, turn-on signal $S_{ON}$ and feedback voltage L1 for generating the power control signal C1 in order that the luminance of the light source 20 can reach the expectation value of the user.

The power supply system of a light source disclosed by the above embodiment of the invention can be considered as a lighter for the light source. After the light source is lighted up, a lower luminance signal is provided by the luminance control unit to change the luminance of the light source, that is, the loading of the power supply system such that when the AC voltage AC is transformed from the actuation voltage to the operational voltage and the frequency of the power control signal C1 outputted by the control circuit is transformed correspondingly, the duty cycle of the power supply system will not exceed the limitation for a normal operation. Moreover, in a short period (a predetermined time period) after the light source is lighted up, the luminance control unit supplies a higher luminance signal such that the luminance of the light source is adjusted to the luminance expected by the user. The power supply system of the invention can improve the conventional issue that the power supply system of the light source exceeds the operational limitation due to improper frequency transformation in the process of lighting the light source to achieve the purpose of lighting up the light source successfully.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power supply system, comprising:
   a luminance control unit, for receiving a turn-on signal and outputting a first luminance signal during a predetermined time period;
   a luminance adjusting unit, for outputting a second luminance signal according to an input of a user; and
   a control circuit, for outputting a power control signal according to one of the first luminance signal and the second luminance signal; and
   a voltage transformer, for outputting an alternating current (AC) voltage for driving a light source according to the power control signal;
   wherein during the predetermined time period, the control circuit outputs the power control signal according to the first luminance signal and after the predetermined time period, the control circuit outputs the power control signal according to the second luminance signal;
   wherein the first luminance signal is substantially smaller than the second luminance signal.

2. The power supply system according to claim 1, wherein the luminance control unit comprises:
   a charging circuit charged by the turn-on signal, the charging circuit comprising a node; and
   a switch, coupled to the node of the charging circuit for controlling whether the first luminance signal is output or not;
   wherein when the voltage of the node is lower than a predetermined voltage, the switch is conducted so that the first luminance signal is outputted to the control circuit;
   wherein when the voltage of the node is higher than the predetermined voltage, the switch is turned off so that the first luminance signal is not outputted to the control circuit;
   wherein the predetermined time period is the time that the charging circuit requires to be charged to make the voltage of the node reach the predetermined voltage.

3. The power supply system according to claim 2, wherein the charging circuit comprises a resistor and a capacitor series connected with the resistor, the switch is a PNP-type bipolar junction transistor (BJT), and the PNP-type BJT has a base, an emitter and a collector, the base is coupled to the node, the emitter is coupled to the control circuit for controlling luminance of the light source, the collector is coupled to the first luminance signal.

4. The power supply system according to claim 2, wherein the luminance adjusting unit is electrically coupled to the specific pin of the control circuit and after the predetermined time period, the control circuit receives the second luminance signal outputted by the luminance adjusting unit.

5. The power supply system according to claim 2, wherein the luminance control unit further comprises a diode, the diode has one end for receiving the turn-on signal and the other end coupled to the charging circuit, after the power supply system is turned off, charges of the charging circuit are discharged via the diode.

6. The power supply system according to claim 1, further comprising a feedback circuit for receiving a feedback current outputted by the light source and generating a feedback voltage for the control circuit according to the feedback current such that the control circuit outputs the power control signal according to the first luminance signal, the second luminance signal and the feedback voltage.

7. A light source actuation method, applied to a power supply system of a light source, the method comprising steps of:
receiving a turn-on signal and accordingly generating a first luminance signal through a luminance control unit;
receiving an adjusting signal and accordingly generating a second luminance signal through a luminance adjusting unit;
selectively receiving the first luminance signal and the second luminance signal by using a control circuit and accordingly generating a power control signal for driving the light source;
wherein during a predetermined time period, the control circuit receives the first luminance signal and accordingly generates the power control signal, and after the predetermined time period, the control circuit receives the second luminance signal and accordingly generates the power control signal;
wherein the first luminance signal is substantially smaller than the second luminance signal.

8. The method according to claim 7, wherein the luminance control unit comprises a charging circuit for receiving the turn-on signal and a switch coupled to the charging circuit, and the method further comprises:
after the luminance control unit receives the turn-on signal, turning on the switch such that the luminance control unit can output the first luminance signal;
charging the charging circuit; and
after the charging circuit finishes charging, turning off the switch such that the luminance control unit does not output the first luminance signal;
wherein the predetermined time period is the time that the charging circuit requires for charging.

9. A power supply system of a light source, comprising:
a light source actuation unit, for outputting a turn-on signal;
a luminance adjusting unit, for outputting a luminance adjusting signal, wherein the luminance adjusting signal is selectively to be one of a higher luminance signal and a lower luminance signal, the higher luminance signal is higher than the lower luminance signal;
a control circuit, electrically coupled to the light source actuation unit and the luminance adjusting unit for outputting a light source luminance signal according to the turn-on signal and the luminance adjusting signal;
a voltage transformer, electrically coupled to the control circuit and outputting an electric power for driving the light source according to the light source luminance signal; and
a luminance control unit, electrically coupled to the luminance adjusting unit and the light source actuation unit, for selectively modifying the luminance adjusting signal;
wherein when the luminance control unit receives the turn-on signal, and the luminance adjusting signal is the higher luminance signal,
(1) the luminance control unit modifies the luminance adjusting signal to be substantially as low as the lower luminance signal for a predetermined time period;
(2) after the predetermined time period, the luminance control unit restores the luminance adjusting signal to be the higher luminance signal.

10. The power supply system according to claim 9, wherein the luminance control unit comprises:
a charging circuit, coupled to the light source actuation unit and charged by the turn-on signal, the charging circuit comprising a node; and
a switch, coupled to the node of the charging circuit and the luminance adjusting unit for controlling the luminance adjusting signal;
wherein when the voltage of the node is lower than a predetermined voltage, the switch is configured to make the luminance adjusting signal changed;
wherein when the voltage of the node is higher than the predetermined voltage, the switch is configured to make the luminance adjusting signal restored as originally outputted from the luminance adjusting unit;
wherein the predetermined time period is the time that the charging circuit requires to be charged to make the voltage of the node reach the predetermined voltage.

11. The power supply system according to claim 10, wherein the charging circuit comprises a resistor and a capacitor, the switch is a PNP-type bipolar junction transistor (BJT), and the PNP-type BJT has a base, an emitter and a collector, the base is coupled to the node, the emitter is coupled to the control circuit for controlling luminance of the light source, and the collector is coupled to a ground voltage, and during the predetermined time period, the luminance control unit outputs the ground voltage to modify the luminance adjusting signal.

12. The power supply system according to claim 11, wherein the luminance adjusting unit is electrically coupled to the control circuit and after the predetermined time period, the luminance control unit stop outputting the ground voltage, so the luminance adjusting signal is restored as originally outputted from the luminance adjusting unit.

13. The power supply system according to claim 10, wherein the luminance control unit further comprises a diode, the diode has one end for receiving the turn-on signal and the other end coupled to the charging circuit, after the power supply system is turned off, charges of the charging circuit are discharged via the diode.

14. The power supply system according to claim 9, further comprising a feedback circuit for receiving a feedback current outputted by the light source and generating a feedback voltage for the control circuit according to the feedback current such that the control circuit outputs the light source luminance signal according to the turn-on signal, the luminance adjusting signal and the feedback voltage.

15. A light source actuation method, applied to a power supply system of a light source, the method comprising steps of:
outputting a turn-on signal by using a light source actuation unit;
outputting a luminance adjusting signal by using a luminance adjusting unit, wherein the luminance adjusting signal is selected to be a higher luminance signal or a lower luminance signal;
selectively changing the luminance adjusting signal by using a luminance control unit;
outputting a light source luminance signal according to the turn-on signal and the luminance adjusting signal by using a control circuit; and
outputting an electric power to drive the light source according to the light source luminance signal by using a voltage transformer;
wherein when the luminance control unit detects the turn-on signal and the luminance adjusting signal is the higher luminance signal, the luminance control unit changes the luminance adjusting signal to be the lower luminance signal to maintain a predetermined time period;

wherein after the predetermined time period, the luminance control unit restores the luminance adjusting signal to be the higher luminance signal.

16. The method according to claim 15, wherein the luminance control unit comprises a charging circuit for receiving the turn-on signal and a switch coupled to the charging circuit and the luminance adjusting unit, and the method further comprises:

after the luminance control unit detects the lighting, turning on the switch such that the luminance control unit can change the luminance adjusting signal to be the lower luminance signal;

charging the charging circuit; and after the charging circuit finishes charging, turning off the switch such that the luminance control unit changes the luminance adjusting signal to be the higher luminance signal;

wherein the predetermined time period is the time that the charging circuit requires for charging.

17. The method according to claim 16, wherein the charging circuit comprises a resistor and a capacitor coupled to a node, the switch is a PNP-type BJT, and the PNP-type BJT has a base, an emitter and a collector, the base is coupled to the node between the resistor and the capacitor, the emitter is coupled to a specific pin of the control circuit for setting luminance of the light source, the collector is coupled to a ground voltage and during the predetermined time period, the luminance control unit outputs the ground voltage to change the luminance adjusting signal to be the lower luminance signal.

18. The method according to claim 16, wherein the luminance adjusting unit is electrically coupled to the specific pin of the control circuit, and after the predetermined time period, the luminance control unit outputs the ground voltage to change the luminance adjusting signal to the higher luminance signal.

19. The method according to claim 16, wherein the luminance control unit further comprises a diode, the diode has one end for receiving the turn-on signal and the other end coupled to the charging circuit, after the power supply system of the light source is turned off, charges of the charging circuit are discharged via the diode.

20. The method according to claim 15, further comprising receiving a feedback current outputted from the light source by a feedback circuit and generating a feedback voltage for the control circuit according to the feedback current such that the control circuit outputs the light source luminance signal according to the turn-on signal, the luminance adjusting signal and the feedback voltage.

* * * * *